United States Patent Office 3,801,530
Patented Apr. 2, 1974

3,801,530
STABILIZED POLYALKYLENE RESIN COMPOSITION AND PROCESS FOR MAKING SAME
William T. Freed, Madison, N.J., assignor to Celanese Corporation, New York, N.Y.
No Drawing. Filed Apr. 12, 1973, Ser. No. 350,429
Int. Cl. C08g 17/40
U.S. Cl. 260—32.6 R     30 Claims

ABSTRACT OF THE DISCLOSURE

The present invention relates to the stabilized compositions of polyalkylene terephthalate resins. More particularly, the present invention relates to the retention of color and physical properties even after high temperature oven-aging of both reinforced and unreinforced polypropylene terephthalate and polybutylene terephthalate molding resins by the addition of a substituted or unsubstituted alkylene bis stearamide.

BACKGROUND OF THE INVENTION

Field of the invention

This invention relates to a stabilized molding resin and to a method of producing same. The invention is directed to a color and physical property stabilized bulk molding resin comprising an intimate blend of polypropylene terephthalate or polybutylene terephthalate and a substituted or unsubstituted alkylene bis stearamide with or without (1) a reinforcing filler and (2) other additives such as flame retardants, etc. The compositions of the instant invention possess significantly greater color and physical property retention than those with additives of similar ilk.

Description of the prior art

Recent investigations with polypropylene terephthalate and polybutylene terephthalate molding resins have found them to be surprisingly superior to polyalkylene terephthalate in many imporant processing and performance characteristics. For example, polypropylene terephthalate and polybutylene terephthalate can be molded and otherwise processed at lower temperatures and have a significantly shorter cycle time in the mold. Furthermore, and of a special significance, these resins do not require, as does polyethylene terephthalate, the presence of a nucleating agent to induce crystallinity. In fact, as pointed out in Ser. No. 854,259, when nucleating agents and/or internal mold release agents are added to polypropylene terephthalate and polybutylene terephthalate molding resins, there results a marked decrease in the surface quality, i.e., the glossy surface finish on products molded therefrom is rendered rough, streaky and uneven. As a direct result, these polypropylene terephthalate and polybutylene terephthalate molding resins which were first disclosed, along with polyethylene terephthalate in U.S. Pat. 2,465,319 to Whinfield and Dickson, free of nucleating agents and/or internal mold release additives have been found to solve processing problems long associated with polyethylene terephthalate and believed, by those skilled in the art, to be equally associated with all polyalkylene terephthalates. Equally significant, these molding resins present a noticeably improved balance of performance properties which those skilled in the art, witness the extensive use of polyethylene terephthalate molding resins to the almost total exclusion of other polyalkylene terephthalates, did not believe to exist. Consequently, the superior processing requirements and physical properties of polypropylene terephthalate and polybutylene terephthalate molding resins make them more commercially desirable, with a wider area of applicability than polyethylene terephthalate.

Although these resins have the above—described advantages, they do suffer from the deleterious effects associated with polymer chain deterioration under long term aging. For example, polypropylene terephthalate and polybutylene terephthalate resins within aproximately two months, realize intrinsic viscosity and tensile strength reductions of about 50% under high temperature aging conditions. Obviously, it would be extremely desirable to find a means to avoid the property reductions associated with long term aging of these resins and hopefully improve same while sustaining the other outstanding short term advantages currently being realized in products molded therefrom.

SUMMARY OF THE INVENTION

This invention relates to a polyalkylene terephthalate molding composition, the specific resins being polypropylene terephthalate and polybutylene terephthalate with intrinsic viscosities in the range from about 0.75 to about 1.5 deciliters per gram so stablized that the usual long term aging deterioration associated with surface finish, color, intrinsic viscosity and physical properties in an article molded therefrom is effectively eliminated. This objective is attained by incorporating into the polyalkylene terephthalate a substituted or unsubstituted alkylene bisstearamide preferably ethylene bisstearamide.

DETAILED DESCRIPTION OF THE INVENTION

The base of the resins of this invention is a polyalkylene terephthalate polymer selected from the group consisting of polypropylene terephthalate and polybutylene terephthalate. These polymers which are the general type described in U.S. Pat. No. 2,465,319 to Whinfield and Dickson, can be produced from the reaction product of a dibasic acid, such as terephthalic acid or a dialkyl ester of terephthalic acid (especially dimethyl terephthalate), and diols having 3 and 4 carbon atoms. Suitable diols include 1,3-propanediol, 1,4-butanediol, 1,3-butanediol, 1,2-propanediol, 1,2-butanediol, 2,3-butanediol and the like.

In the production of the polymers used in this invention, i.e., polypropylene or polybutylene terephthalate, the appropriate bis-(hydroxyalkyl) terephthalate is produced as the intermediate. The bis-(hydroxyalkyl) terephthalate can be prepared by reacting the dialkyl ester of terephthalic acid in which the alkyl radicals can contain from 1 to 7 carbon atoms with about two molecular proportions of the diols described above. It is preferred to use higher proportions of the diol, i.e., in excess of 1.5 moles of the diol per mole of the terephthalate derivative, since by using such proportions, the initial transesterification is caused to take place more rapidly and completely.

The reaction for the esterification is conducted under conditions of elevated temperatures and atmospheric, subatmospheric or superatmospheric pressure. Normally, the desired temperatures of the reaction can range from about the boiling temperature of the reaction mixture to as high as 250° C., if desired.

After the polymer base is prepared, other additives for appearance and property improvements can be incorporated into the molding resins of this invention such as colorants, hardeners, flame retardants, reinforcing agents and the like by intimately blending by either dry blending or melt blending, blending in extruders, heater rolls or other types of mixtures.

As mentioned above, this invention relates to the discovery of a class of stabilizers for the molding resins of the instant invention and to a method of producing such stabilized compositions. The instant compositions possess significantly greater thermal stability, that is, greater color and physical property retention than resin compositions comprising similar polymers heretofore realizable.

Tensile properties, such as yield elongations are determined via the procedures described in ASTM D-638-68 utilizing Type 1 tensile specimens.

The range of intrinsic viscosity of the polypropylene terephthalate and polybutylene terephthalate molding resins should be between about 0.75 to about 1.5 deciliters per gram with the preferred range being between about 0.85 to about 1.4 deciliters per gram, as measured with an eight percent solution, based on the polymer weight, of orthochlorophenol at 25° C.

The objectives of the present invention are realized when polypropylene terephthalate or polybutylene terephthalate is admixed with from about 0.01 to about 1.0 weight percent based on the total weight of the composition and preferably from about 0.05 to about 0.3 weight percent of a substituted or unsubstituted alkylene bis fatty acid amide. The alkylene grouping can contain from 2 to 12 carbon atoms, preferably from 2 to 6 carbon atoms and then fatty acid grouping can contain 2 to 30 carbon atoms preferably 12 to 18 carbon atoms. One of the more preferred substituted groupings upon the fatty acid is a hindered phenol for anti-oxidant purposes. The specifically preferred compounds for use in the instant invention are ethylene bisstearamide; hexane bislauramide and ethylene bis-3 (3,5 ditertiary butyl, 4 hydroxy phenol) propanamide.

If desired, reinforcing fillers can be blended with the polymer or with the monomers in the polymerization reaction as long as the polymerization reaction is not affected. The type of fillers which can be used include among other glass fibers (chopped or continuous rovings), asbestos fibers, talc, calcium silicate, cellulosic fibers, cotton fabric paper, synthetic fibers, metallic powders and the like. The amount of reinforcing filler can range from about 2 to about 80 weight percent, preferably, about 5 to about 60 weight percent based on the total molding composition.

In addition, flame retardants such as those taught in U.S. Ser. No. 46,823 for reinforced resins and Ser. No. 270,753 for unreinforced resin compositions can be utilized in the instant blends.

Specifically preferred flame retardant compounds are the following: pentabromotoluene; tetrabromophthalic anhydride; tetrachlorophthalic anhydride; 3,5,3',5'-tetrabromobiphenyl ether; 3,5,3',5'-tetrachlorobiphenyl sulfide 3,5 - dichloro 3',5' - dibromobiphenyl sulfoxide; 2,4-dichloro 3',4',5'-tri bromobiphenyl methane; decabromobiphenyl ether; 2,2',4,4',6,6' - hexachlorobiphenyl; 2,2', 4,4', 6,6'-hexabromobiphenyl; 3,5,3',5'-tetra bromo 2,2'-bis(4,4'-dihydroxyphenyl) propane, 3,5 - dichloro 3',5'-dibromo 2,2'-bis (4,4'-dimethoxyphenyl) propane and the like. A synergistic flame retarding effect is realized when these compounds are admixed with phosphorus, arsenic, antimony and bismuth containing compounds; preferably the oxides of these groups Vb metals and most preferably with antimony trioxide.

The following examples will illustrate that although nucleating agents and internal mold release additives of the prior art will mar the fine surface characteristics of the instant resins and reduce their color and physical properties significantly, the substituted or unsubstituted alkylene bis fatty acid amides of the instant invention, even at high weight percent loadings, not only do not affect the highly desirable, glossy surface finishes in products molded from the instant resins but serendipitously stabilize the instant polymers under long term high temperature aging conditions. This stability is realized by improved color values and physical characteristics such as tensile strengths and intrinsic viscosities.

EXAMPLE I 1,200 grams of diethyl terephthalate and 900 grams of 1,4 butane diol are mixed together with an appropriate catalyst as described in the Whinfield & Dickson patent, U.S. 2,465,319, such as zinc acetate-antimony trioxide or lead oxide-zinc oxide. The temperature is increased to approximately 200° C. when 80 percent by weight of the methanol has been removed. Vacuum is applied and the temperature is raised to 240–250° C. When the resin composition A is desired, i.e., the high I.V. composition, the vacuum is broken when the intrinsic viscosity has reached 1.0 dl./g. When resin composition B is desired, i.e., the vacuum is again broken when the intrinsic viscosity has reached 1.0 dl./g. and decabromo-biphenyl ether and antimony trioxide are added under nitrogen such that the final composition will contain 9.7 percent by weight of the decabromobiphenyl ether and 3.3 percent by weight of the antimony trioxide based on the total weight of the composition. The mass is then mixed for 5 to 10 minutes and the resultant polymer discharged and chipped in the usual manner. When the resin composition C is desired, the vacuum is broken when the intrinsic viscosity has reached 0.75 dl./g. and the resultant polymer discharged and chipped. The polymer is added to ⅛ inch glass fibers in an amount such that the final resin composition C will contain 30% by weight based on the weight of the total composition of fiber glass, tumble blended for 1 minute melting the polybutylene terephthalate and then extrusion blended by force feeding through a 1-inch single screw extruder with a stranded die. The temperatures of the extruder and die range from 500–510° F. The strands were ground in a milling type mixture to pass through a large screen (4 mesh or smaller).

The Type I tensile bars prepared from the aforementioned compositions were produced on a Stokes screw injection machine under the following identical molding conditions:

Nozzle _____ 510° F.
Barrel cylinders _____ 500° F.
Melt temperature _____ 500° F.
Mold temperature _____ 150° F.
Injection (hydraulic) pressure _____ 1500 p.s.i.
Injection cushion _____ ¼-inch.
Screw speed _____ 80 r.p.m.
Cycle:
   Inject _____ 10 seconds.
   Hold _____ 15 seconds.
   Delay _____ 2 seconds.
                                                  30 seconds.

The following is the well known Hunter Color Value Analysis symbols inserted for reference.

| L | Dark to Bright | 0–100 |
|---|---|---|
| a | —green to +red | + or −100 |
| b | —blue to +yellow | + or −100 |

EXAMPLES II–IX

See Table I. Examples II–IX show the properties realized after high temperature aging at 150° C. for 10 weeks of resin composition A which is a high (1.0 dl./g. I.V.) intrinsic viscosity polybutylene terephthalate resin alone and blended with various well-known-in-the-art nucleating agents and internal mold release/lubricating additives i.e., alumium stearate, zinc stearate, Kantstik Q and Kantstik X. These results are compared to the resin A composition stabilized as taught in the instant invention by the addition of ethylene bisstearamide.

EXAMPLES X–XIII

See Table II. Examples X–XIII show the properties realized after aging at 150° C. for 10 weeks with resin composition B which, as aforedescribed, is a flame retardant, high (1.0 dl./g. I.V.) intrinsic viscosity polybutylene terephthalate resin alone and blended with aluminum stearate and zinc stearate. These results are compared to resin B compositions stabilized, as taught in the instant invention, by the addition of ethylene bisstearamide.

EXAMPLES XIV–XVII

See Table III. Examples XIV–XVII show the properties realized after aging at 175° C. for 10 weeks with resin composition C which is a 30 percent glass reinforced, low (0.75 dl./g. I.V.) intrinsic viscosity polybutylene terephthalate resin alone and blended with prior art nucleating/mold release/lubricating additives, specifically aluminum stearate and zinc stearate. These results are compared to those realized with resin C composition stabilized, as taught in the instant invention, i.e., by the addition of ethylene bisstearamide.

Resin composition C is also blended with (1) 0.1 weight percent hexene bis lauramide and (2) 0.1 weight percent ethylene bis 3 (3,5 dietertiary butyl, 4 hydroxy phenol) propanamide. The results are similar to these obtained with ethylene bis stearamide, i.e., resin C composition is effectively stabilized.

TABLE I
(Examples II–IX)

| Example | Resin composition | Weeks (Aging at 150° C.) | Tensile strength (p.s.i.), yield/break | Elongation (percent), yield/break | Work energy to break (in.-lbs.) | Intrinsic viscosity (dl./g.) | Hunter color value analysis | | |
|---|---|---|---|---|---|---|---|---|---|
| | | | | | | | L | a | b |
| I | A (control) | 0 | 8,000/5,400 | 3.0/315 | 2,450 | 0.94 | 86.5 | +1.1 | +7.9 |
| | | 10 | 2,400 | 0 | 2.0 | 0.56 | 70.8 | +4.0 | +18.7 |
| II | A, plus 0.05 wt. percent ethylene bis stearamide | 0 | 8,100/4,600 | 6.7/270 | 1,865 | 0.97 | 87.0 | +0.8 | +8.2 |
| | | 10 | 3,700 | 0.25 | 3.6 | 0.68 | 70.3 | +3.3 | +16.6 |
| III | A, plus 0.1 wt. percent ethylene bis stearamide | 0 | 8,000/5,000 | 5.0/186 | 1,440 | 0.95 | 86.3 | +0.9 | +8.6 |
| | | 10 | 5,200 | 0.75 | 13.0 | 0.71 | 65.1 | +4.7 | +17.4 |
| IV | A, plus 0.05 wt. percent aluminum stearate | 0 | 8,200/4,800 | 3.0/186 | 1,321 | 0.95 | 87.9 | +0.8 | +7.5 |
| | | 10 | 2,500 | 0 | 5.6 | 0.61 | 74.6 | +3.1 | +19.1 |
| V | A, plus 0.1 wt. percent aluminum stearate | 0 | 8,200/4,700 | 4.8/148 | 1,008 | 0.93 | 89.5 | +0.5 | +6.9 |
| | | 10 | 2,500 | 0 | 2.8 | 0.61 | 78.1 | +1.8 | +17.5 |
| VI | A, plus 0.05 wt. percent zinc stearate | 0 | 8,000/4,800 | 4.2/66 | 703 | 0.98 | 88.4 | +0.3 | +7.3 |
| | | 10 | 2,000 | 0 | 1.6 | 0.57 | 72.3 | +3.1 | +15.4 |
| VII | A, plus 0.1 wt. percent zinc stearate | 0 | 8,000/4,800 | 4.0/228 | 1,472 | 0.92 | 88.8 | +0.2 | +7.0 |
| | | 10 | 3,700 | 0.5 | 4.4 | 0.61 | 68.0 | +3.8 | +15.7 |
| VIII | A, plus 0.1 wt. percent Kantskik Q [1] | 0 | 7,900/4,700 | 6.0/179 | 1,159 | 0.96 | 87.9 | +0.4 | +7.6 |
| | | 10 | 3,000 | 0 | 4.4 | 0.64 | 69.7 | +5.2 | +18.0 |
| IX | A, plus 0.1 wt. percent Kantstik X [1] | 0 | 7,900/4,600 | 3.8/117 | 804 | 0.93 | 86.4 | +1.0 | +8.0 |
| | | 10 | 2,600 | 0 | 3.0 | 0.63 | 70.7 | +4.5 | +20.0 |

[1] Trademarks of Specialty Products Co. for synthetic wax esters containing hydroxyl groups. Federal registration numbers for Q and X are 121.2605 and 121.2501 respectively.

TABLE II
(Examples X–XIII)

| Example | Resin composition | Weeks (Aging at 150° C.) | Tensile strength (p.s.i.), yield/break | Elongation (percent), yield/break | Work energy to break (in.-lbs.) | Intrinsic viscosity (dl./g.) | Hunter color value analysis | | |
|---|---|---|---|---|---|---|---|---|---|
| | | | | | | | L | a | b |
| X | B (Control) | 0 | 8,600/4,700 | 17.0/35.8 | 337.8 | 0.99 | 92.5 | −0.2 | +4.0 |
| | | 10 | 6,600 | 2.0 | 20.8 | 0.80 | 84.8 | +0.5 | +14.9 |
| XI | B, plus 0.1 wt. percent ethylene bis stearamide | 0 | 8,600/5,500 | 10.8/40.3 | 404.7 | 0.99 | 92.1 | −0.1 | +4.5 |
| | | 10 | 8,200 | 2.5 | 34.4 | 0.93 | 80.6 | +1.2 | +13.1 |
| XII | B, plus 0.1 wt. percent aluminum stearate | 0 | 9,200 | 6.0 | 94.0 | 0.88 | 87.3 | +0.3 | +5.8 |
| | | 10 | 5,100 | 0.5 | 10.8 | 0.79 | 83.8 | +1.0 | +13.6 |
| XIII | B, plus 0.1 wt. percent zinc stearate | 0 | 9,300/8,300 | 5.2/115 | 156.7 | 0.89 | 87.5 | +0.7 | +6.2 |
| | | 10 | 4,200 | 0 | 7.4 | 0.76 | 79.7 | +1.9 | +15.2 |

TABLE III
(Examples XIV–XVII)

| Example | Resin composition | Weeks (Aging at 150° C.) | Tensile strength (p.s.i.), yield/break | Elongation (percent), yield/break | Work energy to break (in.-lbs.) | Intrinsic viscosity (dl./g.) | Hunter color value analysis | | |
|---|---|---|---|---|---|---|---|---|---|
| | | | | | | | L | a | b |
| XIV | C (Control) | 0 | 15,900 | 1.8 | 56.6 | 0.72 | 77.9 | −9.4 | +15.5 |
| | | 10 | 11,600 | 0.75 | 23.3 | 0.70 | 47.4 | +7.5 | +17.3 |
| XV | C, plus 0.1 wt., percent aluminum stearate | 0 | 14,600 | 1.3 | 46.7 | 0.71 | 80.6 | −10.3 | +15.4 |
| | | 10 | 10,400 | 0.25 | 18.9 | 0.48 | 54.2 | +4.3 | +15.2 |
| XVI | C, plus 0.1 wt., percent zinc stearate | 0 | 12,100 | 1.5 | 35.0 | 0.67 | 75.0 | −7.6 | +19.5 |
| | | 10 | 11,400 | 0.25 | 23.0 | 0.68 | 53.6 | +5.1 | +14.4 |
| XVII | C, plus 0.1 wt., percent ethylene bis stearamide | 0 | 14,600 | 1.2 | 48.0 | 0.70 | 79.3 | −9.8 | +14.8 |
| | | 10 | 12,000 | 0.5 | 24.0 | 0.71 | 53.6 | +5.9 | +1.71 |
| | | | | | | 0.70 | 78.9 | −10.1 | +14.6 |
| | | | | | | 0.70 | 54.0 | +5.2 | +15.5 |
| | | | | | | 0.70 | 79.0 | −9.4 | +14.9 |
| | | | | | | 0.71 | 53.8 | +4.8 | +15.8 |

Additional experimental bars were molded with resin composition C blended with 0.5 weight percent sodium stearate and 0.5 weight percent pentaerythritol tetrastearate both alone and in combination; however all of the bars produced had patches of very rough and uneven surface texture.

As the above examples indicate, the control compositions characteristically suffer substantial property reduction when subjected to high temperature aging conditions and, in the case of the specific resins of the instant invention, i.e., polypropylene terephthalate and polybutylene terephthalate, this deterioration is made much more severe by the addition of prior-art recognized nucleating agents or internal mold release/lubricating additives which have been used so successfully in the closest homolog to the instant polymers: polyethylene terephthalate.

However, when the alkylene bis fatty acid amides of the instant invention are added to the resin compositions A, B and/or C, the property levels viz a viz the original composition are not only sustained under the extended high temperature aging, but unexpectedly and significantly improved.

Furthermore, the addition of the alkylene bis fatty acid amides of the instant invention had no effect on the characteristically glassy surface appearance of the bars whereas those molded from the compositions containing the other additives had patches of very rough and uneven surface texture with flow marks highly noticeable.

As this invention may be embodied in several forms without departing from the spirit or central characters thereof, the present embodiments are illustrative and not restrictive. The scope of the invention is defined by the claims rather than by the description preceding them and all embodiments which fall within the meaning and range of equivalency of the claims are, therefore, intended to be embraced by those claims.

What is claimed is:

1. A stabilized polyalkylene terephthalate resin composition comprising an intimate blend of a polyalkylene terephthalate selected from the group consisting of polypropylene terephthalate and polybutylene terephthalate, the polyalkylene terephthalate having an intrinsic viscosity in the range of from about 0.75 to about 1.5 deciliters per gram and a substituted or unsubstituted alkylene bis fatty acid amide.

2. The stabilized polyalkylene terephthalate resin composition of claim 1 wherein the weight percent, based on the total composition, of the substituted or unsubstituted alkylene bis fatty acid amide is in the range of from about 0.01 to about 1.0.

3. The composition of claim 2 comprising additionally a reinforcing filler.

4. The composition of claim 3 wherein the reinforcing filler is present in the range of from about 2 to about 80 weight percent based on the total composition.

5. The composition of claim 4 wherein the reinforcing filler is glass fiber.

6. The composition of claim 2 comprising additionally a flame retardant additive.

7. The composition of claim 6 wherein the flame retardant additive is present in the range of from about 1 to about 30 weight percent based on the total composition.

8. The composition of claim 7 comprising additionally from about 2 to about 80 weight percent based on the total composition of a reinforcing filler.

9. The composition of claim 7 wherein the flame retardane additive comprises an aromatic bromine-containing compound stable at temperatures necessary for melt processing the polyalkylene terephthalate and capable of decomposing at combustion temperatures of the polyalkylene terephthalate, and a metal-containing compound, said metal selected from the group consisting of arsenic, antimony, and bismuth, wherein the mol ratio of available metal in the metal-containing compound ranges from about 1:2 to about 1:4 and the weight percent of said metal-containing compound and said aromatic bromine-containing compound flame retardants based on the total weight the composition ranges from about 0.5 to about 17.5 percent.

10. The composition of claim 8 wherein the flame retardant additive is an aromatic halide stable at temperatures necessary for melt processing of the polyalkylene terephthalate and capable of decomposing at combustion temperatures of the polyalkylene terephthalate, and a metal-containing compound, said metal selected from the group consisting of arsenic, antimony, bismuth and phosphorus, wherein the weight ratio of available halide in the aromatic halide to the available metal in the metal-containing compound ranges from about 0.3 to about 4.

11. The composition of claim 2 wherein in the alkylene bis fatty acid amide, the alkylene group has from 2 to 12 carbon atoms and the fatty acid group has from 2 to 30 carbon atoms.

12. The composition of claim 11 wherein the alkylene group has from 2 to 6 carbon atoms and the fatty acid group has from 12 to 18 carbon atoms.

13. The composition of claim 2 wherein the substituted or unsubstituted alkylene bis fatty acid amide is ethylene bis stearamide or hexene bis lauramide.

14. The composition of claim 2 wherein a hindered phenol is substituted upon the fatty acid group.

15. The composition of claim 14 wherein the substituted or unsubstituted alkylene bis fatty acid amide is ethylene bis 3-(3,5-ditertiary butyl, 4-hydroxyphenol) propanamide.

16. A process for preparing a stabilized polyalkylene terephthalate resin composition comprising intimately blending a polyalkylene terephthalate selected from the group consisting of polypropylene terephthalate and polybutylene terephthalate, the polyalkylene terephthalate having an intrinsic viscosity in the range of from about 0.75 to about 1.5 deciliters per gram and a substituted or unsubstituted alkylene bis fatty acid amide.

17. The process of claim 16 wherein the weight percent, based on the total composition, of the substituted or unsubstituted alkylene bis fatty acid amide is from the range of about 0.01 to about 1.0.

18. The process of claim 17 comprising intimately blending, in addition, a reinforcing filler.

19. The process of claim 18, wherein the reinforcing filler is present in the range of from about 2 to about 80 weight percent based on the total composition.

20. The process of claim 10 wherein the reinforcing filler is glass fiber.

21. The process of claim 17 comprising intimately blending, in addition, a flame retardant additive.

22. The process of claim 21 wherein the flame retardant additive is present in the range from about 1 to about 30 weight percent based on the total composition.

23. The process of claim 22 comprising intimately blending in addition from about 2 to about 80 weight percent based on the total composition of a reinforcing filler.

24. The process of claim 22 wherein the flame retardant additive comprises an aromatic bromine-containing compound stable at temperatures necessary for melt processing of the polyalkylene terephthalate and capable of decomposing at combustion temperatures of the polyalkylene terephthalate, and a metal-containing compound, said metal selected from the group consisting of arsenic, antimony and bismuth, wherein the mol ratio of available metal in the metal-containing compound to the available bromine in the aromatic bromine-containing compound ranges from about 1:2 to about 1:4 and the weight percent of said metal-containing compound and said aromatic bromine-containing compound flame retardants based on the total weight of the composition ranges from about 8.5 to about 17.5 percent.

25. The process of claim 23 wherein the flame retardant additive is an aromatic halide stable at temperatures necessary for melt processing of the polyalkylene terephthalate and capable of decomposing at combustion temperatures of the polyalkylene terephthalate, and a metal-containing compound, said metal selected from the group consisting of arsenic, antimony, bismuth and phosphorus, wherein the weight ratio of available halide in the aromatic halide to the available metal in the metal-containing compound ranges from about 0.3 to about 4.

26. The process of claim 17 wherein in the alkylene bis fatty acid amide, the alkylene group has from 2 to 12 carbon atoms and the fatty acid group has from 2 to 30 carbon atoms.

27. The process of claim 26 wherein the alkylene group has from 2 to 6 carbon atoms and the fatty acid group has from 12 to 18 carbon atoms.

28. The process of claim 17 wherein the substituted or unsubstituted alkylene bis fatty acid amide is ethylene bis-stearamide or hexene bis lauramide.

29. The process of claim 17 wherein a hindered phenol is substituted upon the fatty acid group.

30. The process of claim 29 wherein the substituted or unsubstituted bis fatty acid amide is ethylene bis 3-(3,5-ditertiary butyl, 4-hydroxyphenol) propanamide.

References Cited
UNITED STATES PATENTS

| | | | |
|---|---|---|---|
| 3,516,957 | 6/1970 | Gray et al. | 260—40 R X |
| 3,274,144 | 9/1966 | Keskkula et al. | 260—32.6 R |
| 3,671,487 | 6/1972 | Abolins | 260—40 R |
| 3,386,952 | 6/1968 | Gleim et al. | 260—45.95 R |

ALLAN LIEBERMAN, Primary Examiner

S. M. PERSON, Assistant Examiner

U.S. Cl. X.R.

260—40 R, 45.9 NC, 45.95 R

Disclaimer 3,801,530.—*William T. Free*, Madison, N.J. STABILIZED POLYALKYLENE RESIN COMPOSITION AND PROCESS FOR MAKING SAME. Patent dated Apr. 2, 1974. Disclaimer filed Apr. 6, 1977, by the assignee, *Celanese Corporation*.

Hereby enters this disclaimer to claims 1 through 30, inclusive, of said patent.

[*Official Gazette June 7, 1977.*]